United States Patent [19]

Okumura et al.

[11] Patent Number: 4,748,950

[45] Date of Patent: Jun. 7, 1988

[54] INTERNAL COMBUSTION ENGINE SIAMESE PORT TYPE INTAKE SYSTEM CONSTRUCTION WITH INTERNAL RIDGE STRUCTURE PARTIALLY SEPARATING HELICAL PORT AND BYPASS PASSAGE

[75] Inventors: Takeshi Okumura; Takehisa Yaegashi; Yoshihiro Iwashita, all of Toyota, Japan

[73] Assignee: Toyota Jidosha Kabushiki Kaisha, Toyota, Japan

[21] Appl. No.: 16,193

[22] Filed: Feb. 18, 1987

[30] Foreign Application Priority Data

Feb. 25, 1986 [JP] Japan .................. 61-039550

[51] Int. Cl.$^4$ ............................................. F02B 31/00
[52] U.S. Cl. ..................................................... 123/308
[58] Field of Search ............... 123/188 M, 432, 306, 123/308

[56] References Cited

U.S. PATENT DOCUMENTS

| | | | |
|---|---|---|---|
| 4,481,915 | 11/1984 | Makanishi et al. | 123/308 |
| 4,491,102 | 1/1985 | Nakasima | 123/308 |
| 4,527,519 | 7/1985 | Oonaka et al. | 123/308 |
| 4,606,308 | 8/1986 | Furlong | 123/193 H |

FOREIGN PATENT DOCUMENTS

| | | | |
|---|---|---|---|
| 0204926 | 11/1983 | Japan | 123/308 |
| 60-45829 | 3/1985 | Japan . | |
| 60-92733 | 6/1985 | Japan . | |

Primary Examiner—Charles J. Myhre
Assistant Examiner—David A. Okonsky
Attorney, Agent, or Firm—Cushman, Darby & Cushman

[57] ABSTRACT

A cylinder head for an engine is formed with a first straight intake passage which leads to a first intake port, and with a second helical intake passage which leads to a second intake port and is formed with a helical end vortex portion. A common intake passage leads to the upstream ends of the first and second intake passages. A dividing ridge extends from one side of the inner surface of the cylinder head defining the intake passages towards but not reaching an opposite side of that surface, with a gap being left beween the ridge summit portion and that opposite side. The ridge thus divides the second intake passage into a one side portion remote from the first intake passage and terminating in the helical end vortex portion, and another side portion towards that first intake passage which is a straight bypass passage and is communicated at its downstream end to that helical end vortex portion. The upstream end of the ridge is positioned substantially upstream of the point at which the common intake passage becomes bifurcated into the first and second intake passages. A control valve is fitted in the common intake passage between its wall and this upstream ridge end, so as to control the flow resistance of the first straight intake passage and the straight bypass passage. Optionally, the portion of the control valve on the ridge side of the cylinder head inner surface is substantially upstream of the portion thereof on the opposite side thereof.

1 Claim, 2 Drawing Sheets

INTERNAL COMBUSTION ENGINE SIAMESE PORT TYPE INTAKE SYSTEM CONSTRUCTION WITH INTERNAL RIDGE STRUCTURE PARTIALLY SEPARATING HELICAL PORT AND BYPASS PASSAGE

BACKGROUND OF THE INVENTION

The present invention relates to a siamese type construction for an internal combustion engine air-fuel mixture intake system, and more particularly relates to such a siamese type construction for an internal combustion engine intake system, said internal combustion engine incorporating two intake valves and thus being of the three valve type or the four valve type, wherein there is provided an intake control valve construction for selectively supplying intake air-fuel mixture to said two intake valves in varying proportions.

The present invention has been described in Japanese Patent Application Ser. No. Showa 61-039550 (1986), filed by an applicant the same as the applicant or the entity assigned or owed duty of assignment of the present patent application; and the present patent application hereby incorporates into itself by reference the text of said Japanese Patent Application and the claim and the drawings thereof; a copy is appended to the present application.

Further, the present inventors wish hereby to attract the attention of the examining authorities to copending patent application Ser. No. 869,890, now U.S. Pat. No. 4,699,104, which may be considered to be material to the examination of the present patent application.

In the prior art, there have been proposed various types of intake passage structures for internal combustion engine cylinder heads and intake systems, and in particular for so called siamese type cylinder heads. In Japanese Utility Model Laying Open Publication Ser. No. 60-45829 (1985), which it is not intended hereby to admit as prior art to the present patent application except to the extent in any case required by applicable law, there is disclosed an internal combustion engine with, for each of its cylinders, an intake passage structure which incorporates a single initial intake passage portion which then bifurcates into two intake port portions, each one of which then opens to the combustion chamber of said cylinder past a respective one of two separate intake valves provided. Thus, this internal combustion engine incorporates two intake valves for each of its cylinder chambers, and therefore is of the so called three valve type or the so called four valve type. And this type of intake passage construction is typically termed a siamese one, because of the bifurcation or branching of the initial intake passage portion thereof.

Further, in Japanese Utility Model Laying Open Publication Ser. No. 60-92733 (1985), which also it is not intended hereby to admit as prior art to the present patent application except to the extent in any case required by applicable law, there is disclosed such a so called siamese type intake passage construction, which further is elaborated in that it incorporates, as said two branched intake port passage portions, a generally straight intake passage portion and a generally helical intake passage portion arranged in parallel with said generally straight intake passage portion and axially turning around the valve port which it defines into the combustion chamber so that both said generally straight intake passage portion and also said generally helical intake passage portion receive supply of intake air-fuel mixture from the engine intake manifold. Further, according to a dividing wall or bulkhead construction, a bypass passage is provided closer to the side of the generally straight intake passage portion than to the side of the generally helical intake passage portion, and directly connected with the end of the turning portion of the generally helical passage portion, with an intake control valve selectively at least partially interrupting the flow of air-fuel mixture between said generally straight intake passage portion and said bypass passage near the entrance portion of the intake port construction, as well as selectively isolating their respective entrance portions.

With such an intake passage portion structure for an internal combustion engine cylinder head and intake system, when the intake control valve is controlled to be in the closed state by a control system therefor, which is typically done when the current value of engine load is less than a certain determinate threshold value, substantially all of the air-fuel mixture sucked in by the combustion chamber of the engine is inhaled through the generally helical intake passage portion, and is accordingly imparted with strong swirling. Thus, this mode of operation is appropriate for when the engine is operating at low load, as during the idling engine operating condition. In this condition, because of this swirling motion, the limit to which the air-fuel mixture being supplied to the engine can be weakened without engendering deleterious effects is extended. However, at this time the resistance presented to flow of air-fuel mixture by the generally helical intake passage portion by itself alone is relatively high. On the other hand, when the intake control valve is controlled to be in the open state by the control system therefor, most of the air-fuel mixture sucked in by the combustion chamber of the engine is inhaled through the generally straight intake passage portion and through the bypass passage with only a minor proportion thereof being inhaled through the generally helical intake passage portion, and accordingly the inhaled air - fuel mixture as a whole is imparted with relatively weak swirling, and further the resistance presented to flow of air-fuel mixture by the two passage portions together in parallel is relatively low, thus accordingly causing the volumetric efficiency of the engine to be high so as to develop good engine power output; this mode of operation is appropriate for when the engine is operating at high load such as full load. Thus, by the selective operation of the intake control valve, extra swirl is selectively provided for the intake air-fuel mixture which is being sucked into the combustion chamber of the engine, so as to improve the misting of the fuel and in order to increase the intake air-fuel mixture flow speed, thereby to improve the fuel combustibility, the flame front propagation speed, and the firing efficiency, and thereby to militate against engine knocking, thereby to allow the engine to be operated with a weaker intake air-fuel mixture than would otherwise be practicable.

There is however a problem with such an intake passage portion structure for an internal combustion engine cylinder head and intake system, in that, when the control valve is thus controlled to be in the closed state by its control system and substantially all of the air-fuel mixture sucked in by the combustion chamber of the engine is being inhaled through the generally helical intake passage portion and is accordingly being imparted with strong swirling, although the above described advantages of the air/fuel ratio operating region being extended in the weakness direction, improved fuel combustibility, increased flame front propagation speed and firing efficiency, and improved engine anti knock characteristic are obtained, nevertheless on the other hand the richer portions of the air-fuel mixture are preferentially biased towards the peripheral portions (i.e. the circumferential side portion) of the combustion chamber due to the effect of so called centrifugal force caused due to this swirling action, and the air/fuel ratio at the central portion of the combustion chamber tends to be weaker than at other portions thereof, i.e. tends to be weaker than the overall air/fuel ratio in the combustion chamber as a whole. Since it is typical for the spark plug for such an engine combustion chamber in fact to be mounted at said central portion thereof, the problem arises that air-fuel mixture of a richness sufficient to be ignited by said spark plug is not reliably obtained at said central portion of said combustion chamber around said spark plug, and thereby, particularly when the air/fuel ratio of the overall air-fuel mixture being supplied to the combustion chamber or chambers is near the limit in the weakness direction, the fluctuations of combustion are increased, and torque fluctuations from cycle to cycle of the internal combustion engine are increased due to inferior ignition performance, and thereby particularly the idling operation stability of the engine, and the drivability of a vehicle incorporating it, are undesirably deteriorated.

SUMMARY OF THE INVENTION

The inventors of the present invention have considered the various problems detailed above in the case when an intake passage control valve is provided for controlling the distribution of air-fuel mixture between a generally straight intake passage construction and a generally helical intake passage construction of the engine, from the point of view of the desirability of providing stable ignition performance of the engine even when such an intake passage control valve is in the closed position.

Accordingly, it is the primary object of the present invention to provide an intake system construction for an internal combustion engine of the variable swirl siamese type, which avoids the problems detailed above.

It is a further object of the present invention to provide such a variable swirl siamese port type construction for an internal combustion engine intake system, which prevents uneven operation of the engine, especially during idling operation.

It is a further object of the present invention to provide such a variable swirl siamese port type construction for an internal combustion engine intake system, which prevents the occurrence of fluctuations in the torque output of the engine, especially during idling operation.

It is a further object of the present invention to provide such a variable swirl siamese port type construction for an internal combustion engine intake system, which prevents fluctuations in fuel ignitability and combustibility.

It is a further object of the present invention to provide such a variable swirl siamese port type construction for an internal combustion engine intake system, which keeps engine drivability high.

It is a further object of the present invention to provide such a variable swirl siamese port type construction for an internal combustion engine intake system, which allows engine maximum output power to be enhanced.

It is a further object of the present invention to provide such a variable swirl siamese port type construction for an internal combustion engine intake system, which allows engine maximum output torque to be enhanced.

It is a further object of the present invention to provide such a variable swirl siamese port type construction for an internal combustion engine intake system, which allows engine mechanical octane value to be enhanced.

It is a further object of the present invention to provide such a variable swirl siamese port type construction for an internal combustion engine intake system, which allows engine fuel efficiency to be enhanced.

It is a further object of the present invention to provide such a variable swirl siamese port type construction for an internal combustion engine intake system, which allows the engine to be operated on a so called fast burn operational regime.

It is a further object of the present invention to provide such a variable swirl siamese port type construction for an internal combustion engine intake system, which provides good ignition characteristics for the engine.

It is a further object of the present invention to provide such a variable swirl siamese port type construction for an internal combustion engine intake system, which allows the engine to be operated with a very weak mixture.

It is a further object of the present invention to provide such a variable swirl siamese port type construction for an internal combustion engine intake system, which allows for reduction of the flame propagation distance in the engine combustion chamber or chambers.

It is a yet further object of the present invention to provide such a variable swirl siamese port type construction for an internal combustion engine intake system, which allows for increase of the flame propagation speed in the engine combustion chamber or chambers.

It is a yet further object of the present invention to provide such a variable swirl siamese port type construction for an internal combustion engine intake system, which has good characteristics with regard to engine volumetric efficiency.

It is a yet further object of the present invention to provide such a variable swirl siamese port type construction for an internal combustion engine intake system, which provides good microturbulence in the combustion chambers of the engine.

It is a yet further object of the present invention to provide such a variable swirl siamese port type construction for an internal combustion engine intake system, which provides supply of air-fuel mixture of relatively uniform air/fuel ratio to the combustion chambers of the engine.

It is a yet further object of the present invention to provide such a variable swirl siamese port type construction for an internal combustion engine intake system, which prevents droplets of liquid fuel from adhering to the valve member of such an intake passage control valve.

According to the most general aspect of the present invention, these and other objects are attained by an intake system construction for an internal combustion engine cylinder head formed with a surface at least partly defining combustion chamber, comprising: a first generally straight intake passage portion defined in said cylinder head which leads to a first intake port opening to said combustion chamber; a second generally helical intake passage portion defined in said cylinder head which leads to a second intake port, also opening to said combustion chamber, formed with a generally helical end vortex portion; a common intake passage leading to the upstream ends of said first generally straight intake passage portion and of said second generally helical intake passage portion; a protruding dividing barrier ridge portion, extending from a one side of the inner surface of said cylinder head which defines said first and second intake passage portions towards but not so far as to reach an opposite side of said cylinder head passage portion defining surface, with a gap being left between a summit portion of said barrier ridge portion and said opposite side of said cylinder head passage portion defining surface, said barrier ridge portion dividing said second intake passage portion into a one side portion remote from said first intake passage portion which terminates in said generally helical end vortex portion, and another side portion towards said first intake passage portion which is a generally straight bypass passage portion and which is communicated at its downstream end to said generally helical end vortex portion; the upstream end portion of said barrier ridge portion being positioned substantially upstream of the point at which said common intake passage becomes bifurcated into the upstream ends of said first generally straight intake passage portion and of said second generally helical intake passage portion; and: a control valve fitted in said common intake passage between a wall thereof and said upstream end portion of said barrier ridge portion, so as to control the flow resistance of said first generally straight intake passage portion and of said generally straight bypass passage portion.

According to such an intake system construction as specified above, when the control valve is closed, the greater part of the intake air-fuel mixture passes through the one side portion of said second intake passage portion remote from said first intake passage portion which terminates in said generally helical end vortex portion, and is imparted with substantial swirling motion as it flows into said combustion chamber past said generally helical end vortex portion. However, a part of said intake air-fuel mixture passes over said gap left between said summit portion of said barrier ridge portion and said opposite side of said cylinder head passage portion defining surface, to enter into said generally straight bypass passage; and then a portion of said leaked air-fuel mixture can flow towards said first generally straight intake passage portion and through said first intake port opening into said combustion chamber, not being particularly imparted with any swirling at this time. Hence, a certain quantity of air-fuel mixture is supplied to the central portion of the combustion chamber, and, even if as is typical part of the fuel incorporated in the air-fuel mixture which as mentioned above flows into said combustion chamber past said generally helical end vortex portion is pushed by the action of centrifugal force away from said central portion of the combustion chamber which typically contains said spark plug, nevertheless the presence of this directly supplied certain quantity of air-fuel mixture in said central portion of the combustion chamber ensures that combustion conditions around the vicinity of said spark plug are kept realistic, with the air-fuel mixture in this area being sufficiently rich for ignition by said spark plug to be consistently and appropriately performed. Hence, the problems outlined above due to indifferent ignition performance cease to substantially exist, and it becomes possible to make the air/fuel ratio of the air-fuel mixture supplied to the internal combustion engine combustion chambers as a whole leaner, and nevertheless it is possible to prevent uneven operation of the engine, especially during idling operation. Thereby, this variable swirl siamese port type construction for an internal combustion engine intake system prevents the occurrence of fluctuations in the torque output of the engine, especially during idling operation, and prevents fluctuations in fuel ignitability and combustibility, thus keeping engine drivability high. Furthermore, engine mechanical octane value is enhanced. Because this variable swirl siamese port type construction for an internal combustion engine intake system thus provides good ignition characteristics for the engine, it allows the engine to be operated with a very weak mixture on a so called fast burn operational regime, with an increased flame propagation speed in the engine combustion chambers.

On the other hand, when the control valve is opened, while still a part of the intake air-fuel mixture passes through the one side portion of said second intake passage portion remote from said first intake passage portion which terminates in said generally helical end vortex portion and then through the second intake port into the combustion chamber, in fact most of said intake air-fuel mixture passes through the first generally straight intake passage portion and then through the first intake port into the combustion chamber, without being imparted with any substantial swirling motion as it flows into said combustion chamber; and therefore intake efficiency is high, and engine volumetric efficiency is of the high level associated with the utilization of twin intake ports, and it becomes possible to have high engine power and torque output at high engine load, and particularly during full throttle engine operational conditions.

And, according to a particular specialization of the present invention, the above and other objects may more particularly be accomplished by such an intake system construction as specified above, wherein the portion of said control valve on said one side of said inner surface of said cylinder head which defines said first and second intake passage portions is substantially upstream of the portion of said control valve on said opposite side of said cylinder head passage portion defining surface. In this case, there will be a benefit with regard to prevention of droplets of liquid fuel from adhering to the control valve member of such an above mentioned intake passage control valve.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENT

The present invention will now be described with reference to the preferred embodiment thereof, and with reference to the figures.

Figure 1:
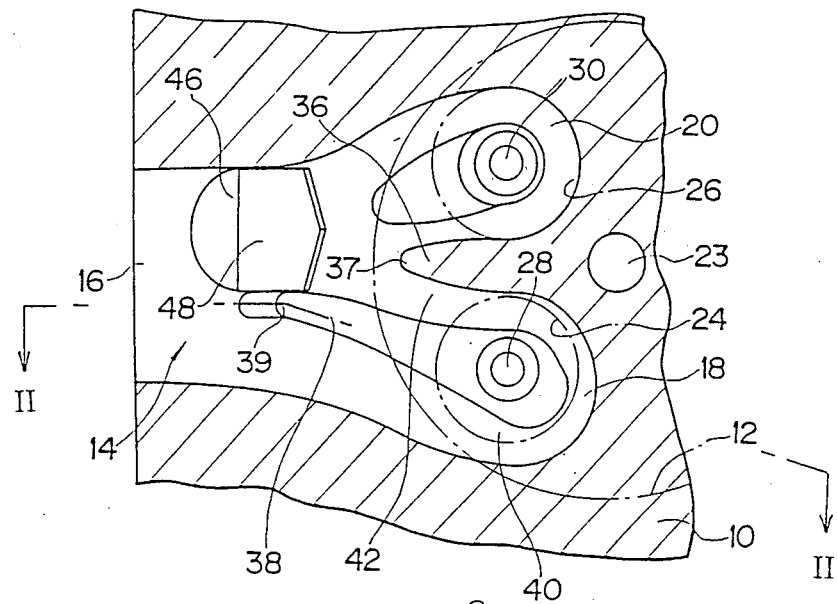
FIG. 1 is a partial sectional view of an internal combustion engine cylinder head incorporating the preferred embodiment of the intake system construction of the present invention, taken in a plane perpendicular to the central longitudinal axis of a cylinder bore of said internal combustion engine.
Figure 2:
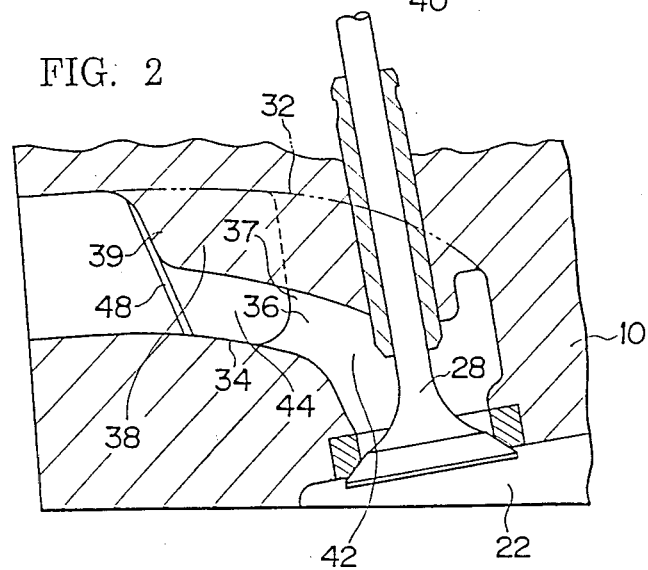
FIG. 2 is a partial sectional view of said cylinder head and said preferred embodiment of the intake system construction of the present invention, taken in a plane parallel to the central longitudinal axis of said cylinder bore and indicated by the arrows II—II in FIG. 1.
Figure 3:
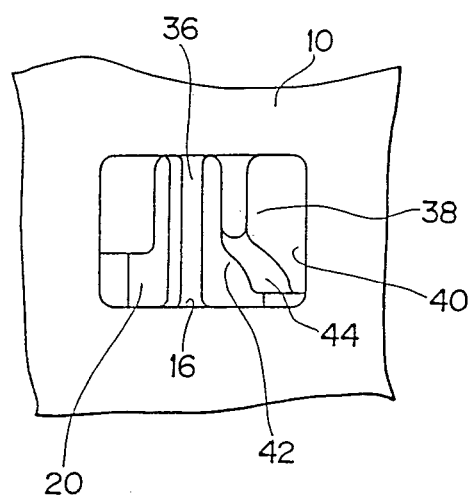
FIG. 3 is a frontal view of the portion opening to the outside of the cylinder head of said preferred embodiment of the intake system construction of the present invention, as seen from the left side of FIG. 1.

In the preferred embodiment of the intake system construction of the present invention, shown in sectional views in FIGS. 1 and 2 and in frontal view in FIG. 3, the reference numeral 10 denotes the cylinder head of an internal combustion engine, which is fitted onto a cylinder block, not particularly shown. This not particularly illustrated cylinder block is formed with a plurality of cylinder bores of which only one is partially shown in FIG. 1 by the single dotted circular portion, and is therein denoted as 12. The sectional view of FIG. 1 is taken in a plane perpendicular to the central longitudinal axis of said shown cylinder bore 12, while the sectional view of FIG. 2 is taken in a plane generally parallel to said central longitudinal axis of said cylinder bore 12 and indicated by the arrows II—II in FIG. 1. In this cylinder bore 12, as is per se conventional, there reciprocates a piston not particularly shown, and between said piston, said cylinder head 10, and the upper portion of said cylinder bore 12 there is defined a combustion chamber 22 for this piston and cylinder.

For each such cylinder as this, the cylinder head 10 is formed with an intake port construction, only one of which is shown in the figures, generally designated by the reference numeral 14 and including two intake port portions 18 and 20, both of which which open via respective valve seats to the combustion chamber 22. And these intake port portions 18 and 20 are arranged on the one side of the combustion chamber 22 (the left from the point of view of FIG. 1); on the other side of said combustion chamber 22, not shown, there are provided one or two exhaust valves, not particularly illustrated. Poppet intake valves 28 and 30 of a per se known type, only one of which can be seen in the sectional view of FIG. 2, and mounted in per se known valve guides fitted in the cylinder head 10, are provided for cooperating with intake valve seats inset around the edges of each of the intake port portions 18 and 20 where they open to the combustion chamber 22, so as to provide per se conventional open/close control of communication between said intake port portions 18 and 20 and said combustion chamber 22; and another poppet valve or valves is or are similarly provided for similarly cooperating with an exhaust valve seat or seats inset around the edges of the exhaust port or ports, not particularly shown. And by actuation of these intake poppet valves 28 and 30 and this exhaust poppet valve or valves by a per se known type of valve gear not particularly shown, the internal combustion engine is caused to operate according to an Otto cycle so as to generate rotational power, as is per se conventional. And, as shown in FIG. 1, in this preferred embodiment substantially in the central portion of the portion of the cylinder head 10 defining the roof of the combustion chamber 22, there is formed a screwed hole 23 for fitting a spark plug, not particularly shown, thereinto.

In more detail, the cylinder head 10 is formed with an intake plenum 16 opening at its outside left side as seen in FIGS. 1 and 2, as shown in frontal view in FIG. 3, and this intake plenum 16 is branched into the two intake port portions 18 and 20. The intake port portion 20 is formed as a generally straight intake passage, while the other intake port portion 18 is formed with a helical portion 40 as will be explained shortly, thus being appropriately described as generally helical. And the generally straight intake port passage 20 is separated from the generally helical intake port passage 18 by a dividing bulkhead or wall 36, which extends completely between and connects the upper wall 32 of this intake port passage construction and the lower wall 34 thereof (vide FIG. 2). The upstream edge portion of this dividing wall 36 is designated in the figures as 37. And the generally straight intake port passage 20 debouches into the combustion chamber 22 through the valve seat controlled by the intake poppet valve 30, while the generally helical intake port passage 18 debouches into said combustion chamber 22 through the valve seat controlled by the other intake poppet valve 28. Thus, the lower side as seen in the view of FIG. 1 of the downstream portion of the air-fuel mixture intake system defines the generally helical intake port passage 18, and air-fuel mixture flowing through this generally helical intake port passage 18, when the intake poppet valve 28 is opened of course, impinges against a vortex portion formed around the stem of said intake poppet valve 28 in said helical port passage 18 and is imparted with substantial swirling motion.

In detail, this generally helical intake port passage 18 is partly partitioned into two passage portions 40 and 42, with a certain amount of communication remaining between said two passage portions, by a protruding wall portion 38 which extends from the upper defining wall 32 of this intake port passage construction a certain distance downwards as seen in FIG. 2 towards the lower defining wall 34 thereof, but not so far as to reach said lower defining wall 34; rather, a slot shaped gap 44 is left open between the lower edge as seen in FIG. 2 of said protruding wall portion 38 and said lower defining wall 34 of the intake port passage construction. Thus, the generally helical intake port passage 18 is divided into a relatively straight bypass passage portion 42 on the side of said port passage 18 towards the generally straight intake port passage 20, and a relatively helical passage portion 40 on the side of said port passage 18 remote from said generally straight intake passage 20, said helical passage portion 40 ending at the aforesaid valve seat for the poppet valve 28, in more detail directing flow of intake air-fuel mixture around a helically shaped surface formed around said valve seat, in the counterclockwise direction as shown in FIG. 1, i.e. from the side of said poppet valve 28 remote from the other generally straight intake port passage 20. The upstream edge of this protruding wall portion 38 is designated in the figures as 39, and is located as considerably upstream from the upstream edge of the dividing wall 36 between the generally helical intake port passage 18 and the generally straight intake port passage 20. Further, this upstream edge 39 of the protruding wall portion 38 is biased sideways with respect to the upstream edge 37 of the dividing wall 36, towards the side of the helical passage portion 40, by a certain amount which may typically be about 0.15 to 0.25 times the total width of the intake plenum 16.

Thus, flow of intake air-fuel mixture first enters the cylinder head 10 into the intake plenum 16 upstream of the two intake port passages 18 and 20, and then is divided by impinging upon the upstream edge portion 39 of the protruding wall portion 38, which separates said air-fuel mixture flow into two streams, so that part of said air-fuel mixture flow enters into the upstream end of the helical passage portion 40 of the generally helical intake port passage 18, while the remainder of said air-fuel mixture flow continues downstream, to again be divided by impinging upon the upstream edge portion 37 of the dividing wall 36, which again separates said remainder air-fuel mixture flow into two further streams, so that part of said air-fuel mixture flow enters into the upstream end of the bypass passage portion 42 of the generally helical intake port passage 18, while the remainder of said air-fuel mixture flow enters into the upstream end of the generally straight intake port passage 20.

At the side of this upstream edge portion 39 of the protruding wall portion 38, and to the side of it away from the helical passage portion 40, there is provided a butterfly type air-fuel mixture intake control valve 46, which is fixedly mounted on a shaft not particularly shown in the figures, and which is selectively positioned via said shaft by a control system and an actuating device which will be described shortly to either one of: a closed position as shown in FIGS. 1 and 2 in which said air-fuel mixture intake control valve 46 substantially closes the upstream end of said generally straight intake port passage 20 and also the upstream end of the bypass passage portion 42 of the generally helical intake port passage 18 while of course leaving uninterfered with the helical passage portion 40 of said generally helical intake port passage 18; or an open position, not particularly illustrated but angularly spaced approximately 90° from its said shown closed position, in which said air-fuel mixture intake control valve 46 substantially leaves said upstream ends of said generally straight intake port passage 20 and said bypass passage portion 42 open and uninterfered with. And, as particularly well shown in FIG. 2, the rotational axis of this air-fuel mixture intake control valve 46 is slanted with respect to the upper and lower defining wall portions 32 and 34 of the intake passage construction, so that, particularly, the portion of said air-fuel mixture intake control valve 46 on the lower defining wall 34 side in FIG. 2 of said intake passage construction which does not have the protruding wall portion 38 formed on it is more downstream, that is the portion of said air-fuel mixture intake control valve 46 on the other upper side 32 in said figure of said intake passage construction which does have said protruding wall portion 38 formed on it. This aids with the smooth supply to the combustion chamber 22 of any droplets of liquid fuel which might condense upon the air-fuel mixture intake control valve 46.

This air-fuel mixture intake control valve 46 is rotationally driven, via its aforesaid drive shaft and a drive lever or the like not particularly shown, by a control system incorporating a drive means also not shown which may incorporate a diaphragm device or the like, and is typically operated by said control system in a per se known manner, as follows: said air-fuel mixture intake control valve 46 is closed, so as to intercept the upstream end of said generally straight intake port passage 20 and also so as to intercept the upstream end of the bypass passage portion 42, when the internal combustion engine is being operated at an engine load level lower than a determinate value, while on the other hand said air-fuel mixture intake control valve 46 is opened, so as to open said upstream end of said generally straight intake port passage 20 and also so as to open said upstream end of said bypass passage portion 42, when said internal combustion engine is being operated at an engine load level higher than said determinate value. The details of this control system will not be particularly discussed in this specification because they will be easily supplemented by one of ordinary skill in the relevant art, without undue experimentation, based upon the disclosures herein.

Operation

This preferred embodiment of the intake system construction of the present invention operates as will now be described.

In the low engine load operational area, the control system positions the air-fuel mixture intake control valve 46 to its closed position as shown in FIGS. 1 and 2, thus causing direct flow of air-fuel mixture through the generally straight intake port passage 20 and the bypass passage portion 42 to be interrupted, so that all of the air-fuel mixture flow inhaled by the combustion chamber 22 is directd to enter into the upstream end of the helical passage portion 40 of the generally helical intake port passage 18. Now, most of this air-fuel mixture flow passes all the way down through said helical passage portion 40 and then passes through the intake valve port controlled by the intake poppet valve 28 into the combustion chamber 22 with a substantial amount of swirling being imparted to said sucked in air-fuel mixture as it enters said combustion chamber 22 by the vortex portion formed around the stem of said intake poppet valve 28; this swirling is in the counterclockwise direction as seen from the point of view of FIG. 1 around the central axis of the cylinder bore 12. The flow resistance of the intake system is now relatively high, due to the fact that the air-fuel mixture intake control valve 46 is in its closed position. However, at this time a minor but still considerable proportion of this air-fuel mixture flow passing down through said helical passage portion 40 spills over the edge of the protruding wall portion 38, i.e. passes through the slot or gap 44, so as to enter into the bypass passage portion 42, and some of this spillover flow even can further enter into the generally straight intake passage 20. As a result, although the air-fuel mixture intake control valve 46 is currently set to its closed position, a proportion of the intake air-fuel mixture passes into the combustion chamber 22 via the bypass passage portion 42 and also even via the generally straight intake port passage 20. Accordingly, an air-fuel mixture of an average air/fuel ratio comes to be stably supplied into the central region of the combustion chamber 22, where the spark plug as fitted into the spark plug hole 23 is disposed, and this ensures that an air-fuel mixture of sufficient air/fuel ratio for proper ignition by said spark plug is supplied to the vicinity of said spark plug, even though as a whole the fuel in the air-fuel mixture which is being supplied into the combustion chamber 22 may be pushed to the preipheral edge portions of said combustion chamber 22 by the action of so called centrifugal force caused by the high degree of intake swirl which is being provided. Thereby, ignition of this air-fuel mixture by said spark plug is reliably carried out, and the fluctuations of combustion are limited, and therefore torque fluctuations from cycle to cycle of the internal combustion engine are controlled, and thereby particularly the idling operation stability of the engine, and the drivability of a vehicle incorporating it, are maintained as good. Further, when the air-fuel mixture is in fact ignited by said spark plug, because comparatively strong swirling has been imparted to the air-fuel mixture in the combustion chamber 22 due to the majority of said air-fuel mixture passing through the helical passage portion 40 of the generally helical intake passage 18, the fuel combustibility, the flame front propagation speed, and the firing efficiency are all improved, i.e. so called quick burn occurs, and also engine knocking is militated against and the mechanical octane value of the engine is maintained as good, and thereby the engine can be operated with a weaker intake air-fuel mixture than would otherwise be practicable.

On the other hand, in the high engine load operational area, the not shown control system opens the air-fuel mixture intake control valve 46 to its open position not particularly shown in the figures, thus causing direct flow of air-fuel mixture through the generally straight intake port passage 20 and also through the bypass passage portion 42 to be now allowed, so that most of the air-fuel mixture flow inhaled by the combustion chamber 22 now enters into the combustion chamber 22 through the generally straight intake port passage 20, with only a minor amount passing through the helical passage portion 40 or the bypass passage portion 42 of the generally helical intake port passage 18. Accordingly, only a relatively low amount of swirling as a whole is imparted to said sucked in air-fuel mixture as it enters said combustion chamber 22 by the vortex portion formed around the stem of the intake poppet valve 28. Thus, good volumetric efficiency for the engine is obtained, and high power output can be attained, and in summary the advantages of a twin intake port type internal combustion engine cylinder head passage construction can be attained, and in particular high output torque and high output power during full engine throttle operation can be attained. And, in this operational condition, the flow resistance of the intake system is at its minimum and also the swirling induced therein is at its minimum, due to the fact that the air-fuel mixture intake control valve 46 is now in its opened position.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. A generally Y-shaped intake passage assembly for an internal combustion engine cylinder head having a first intake port and a second intake port, said assembly comprising:

a common passage portion defining an upstream portion of the intake passage assembly;

a first branch passage portion coupled to and extending from a downstream end of said common passage portion toward said first intake port;

a second branch passage portion coupled to and extending from said downstream end of said common passage portion toward said second intake port;

a first partition wall defined between said first and second branch passage portions and separating said first and second branch passage portions from one another, said first partition wall having an upstream edge;

a second partition wall mounted so as to extend longitudinally from an upstream edge thereof disposed in a downstream portion of said common passage portion and spaced substantially upstream from said upstream edge of said first partition wall, said second partition wall extending from said upstream edge through said downstream portion of said common passage portion and through said first branch passage portion along a longitudinal axis of said first branch passage portion, a downstream edge of said second partition wall being disposed in said first intake port, said second partition wall projecting transversely from a sidewall portion of said downstream portion of said common passage portion and projecting transversely from a sidewall portion of said first branch passage portion so as to define a longitudinal edge located at a central portion of the cross section of said downstream portion of said common passage portion and a central portion of the cross section of said first branch passage portion, said second partition wall defining in said downstream portion of said common passage portion and said first branch passage portion a helical passage portion extending along a side wall portion of said downstream portion of said common passage portion and said first branch passage portion and a straight passage portion extendng along said first partition wall toward said first intake port; and a valve mounted substantially adjacent said upstream edge of said second partition wall so as to traverse a portion of the cross section of said common passage portion for selectively closing said portion of the cross section of said common passage portion while enabling communication between said straight passage portion in said first branch passage portion and said common passage portion and communication between said second branch passage portion and said common passage portion through a gap defined between said longitudinal edge of said second partition wall and a side wall portion of said downstream portion of said common passage portion and said first passage portion opposing said longitudinal edge.

* * * * *